United States Patent [19]

Bauman

[11] Patent Number: 4,818,986

[45] Date of Patent: Apr. 4, 1989

[54] APPARATUS FOR CONTROLLING ACCESS TO DATA STORAGE DEVICES

[76] Inventor: Robert M. Bauman, 8697 E. Cheryl Dr., Scottsdale, Ariz. 85258

[21] Appl. No.: 6,810

[22] Filed: Jan. 27, 1987

[51] Int. Cl.⁴ .............................................. H04Q 1/00
[52] U.S. Cl. ................................. 340/825.31; 361/339; 361/390; 361/391
[58] Field of Search ................ 364/184; 361/338, 390, 361/391, 339; 200/50 R, 50 AA; 362/802, 276, 155, 137; 340/825.31, 825.32; 312/183, 215, 223

[56] References Cited

U.S. PATENT DOCUMENTS

| | | | |
|---|---|---|---|
| 518,713 | 4/1894 | Connell | 362/802 X |
| 1,497,728 | 6/1924 | Kresh | 362/155 X |
| 1,532,935 | 4/1925 | Patton | 362/155 X |
| 1,993,477 | 3/1935 | Gourley et al. | 312/215 X |
| 2,422,847 | 6/1947 | Peter | 362/155 X |
| 2,514,246 | 7/1950 | Knox | 361/391 |
| 2,609,268 | 9/1952 | Nye | 361/391 X |
| 3,289,044 | 11/1966 | Ginsberg | 361/391 |
| 4,289,764 | 9/1981 | Staab et al. | 361/391 X |
| 4,614,383 | 9/1986 | Polley et al. | 361/391 X |

Primary Examiner—Ulysses Weldon
Attorney, Agent, or Firm—Nelson & Roediger

[57] ABSTRACT

Secured storage apparatus for preventing unauthorized access to information contained within data storage devices contained therein which utilizes a power disabling mechanism contained within the secured storage enclosure.

10 Claims, 2 Drawing Sheets

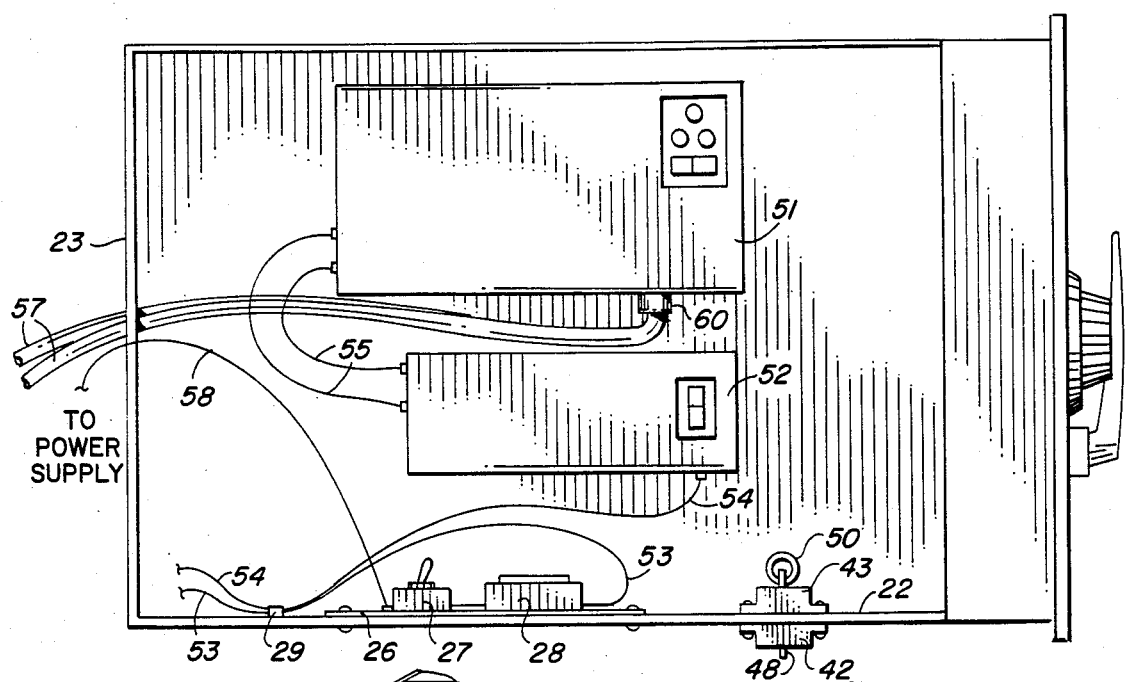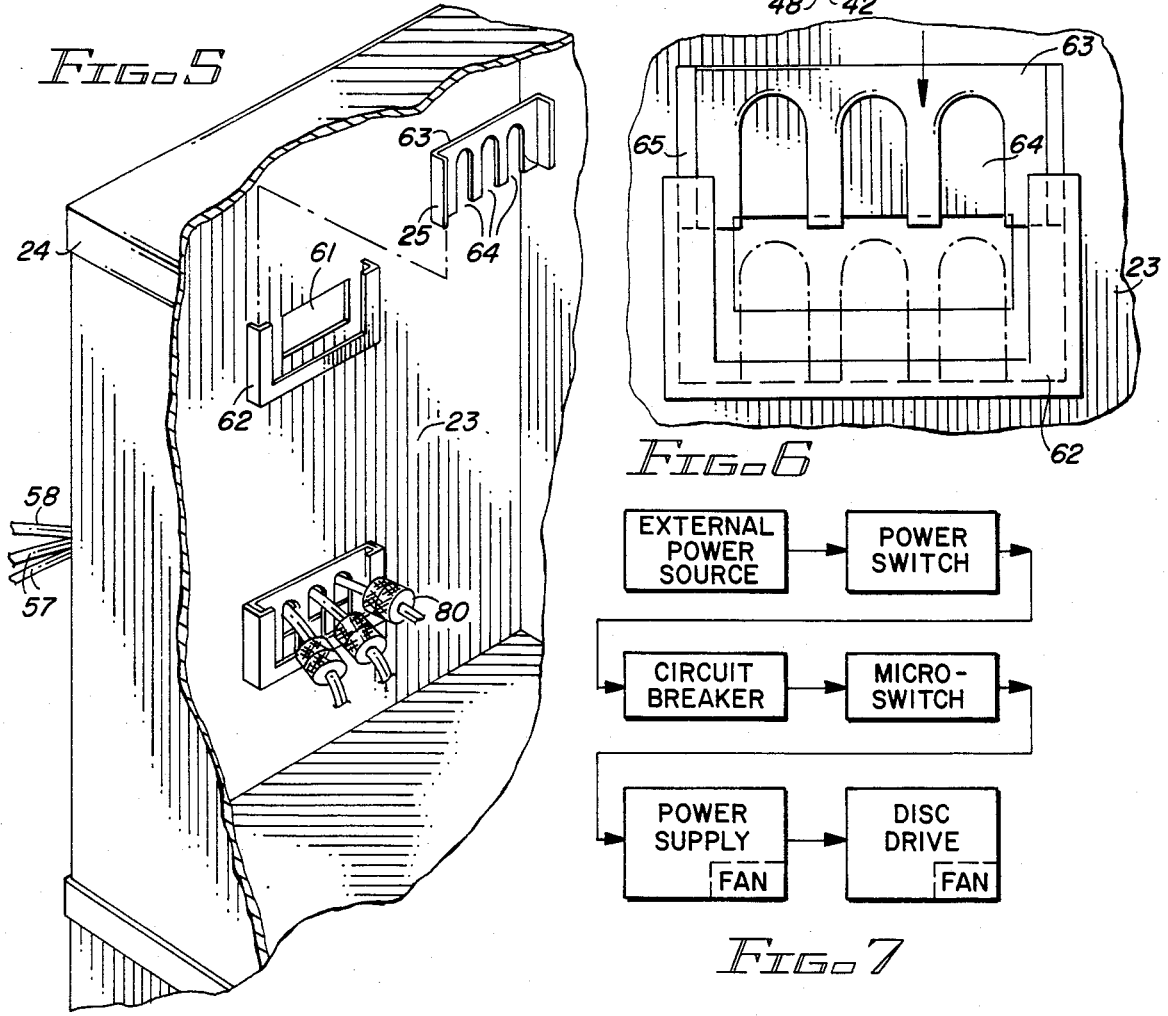

APPARATUS FOR CONTROLLING ACCESS TO DATA STORAGE DEVICES

BACKGROUND OF THE INVENTION

This invention relates to novel security apparatus for controlling user access to electronic devices contained therein and, in particular, to apparatus limiting access by providing control of the power supply coupling network so as to prevent unauthorized activation and use of electronic data storage devices.

The ever-increasing reliance on computers to store and analyze masses of data has generated a present need for structures which limit access to the stored data with which the computer performs its functions. In the past, large computers have relied on central memory with both of these installations being characteristically bulky. At present, the desk-top computer possesses capabilities previously only available from large central computers. Consequently, the local memory storage device has to handle a correspondingly larger amount of data and plays a greater role in a linked computer network. The decentralization of the data storage has created further need for data security since the possibility of unauthorized access to the data is increased. In addition, the networking of a multiplicity of computers has given additional impetus to the use of increased capacity local storage since the data link capability between central storage and remote computers serves as a limiting factor in many cases. The resultant editing and processing of data locally at the remote work station with only the final product then being sent to the central location over the data link have made the expanded local storage devices and the data bases contained therein more important parts of the networked system.

The assembly of a data base is a time consuming task and results in the creation of a valuable asset. Frequently, the information comprising the data base includes proprietary or sensitive information which is to be prevented from dissemination to competitors or persons within the organization not having a need to know. Further, the basis for protection of trade secrets requires owners of proprietary information to take steps to maintain the stored information confidential and thus control access to data storage devices.

Since the storage capabilities of recording media have dramatically increased in the recent past, a substantial data base can be included in a portable electronic device. These components are peripheral to the mainframe of the computer and are generally referred to as disk drives. The disk drive can be receptive of removable, flexible disks of the type commonly utilized with the home or micro computer or, alternatively, can be the Winchester disk drive type, wherein the storage medium is not removed from the electronic component.

While the family of Winchester disk drives includes a wide range of data storage capabilities, it is not uncommon to find that a single storage device has the capability of storing well in excess of 100 MB. As a result, an extremely valuable asset in a form of the stored data base is contained in a relatively compact disk drive which is well within the transport capability of the average person. As a result, security considerations have resulted in creating a demand for the provision of structural means which control access to the disk drives containing the data bases.

In the past, it has not been uncommon for each user of a data base to be assigned his own disk drive and to be responsible for the physical item. The user then carries this disk drive with him wherever he goes. At the conclusion of his work task, the user returns the disk drive to a secure environment, for example, a central vault. Thus, security is dependent on the user adhering to a set of conditions which can be awkward to follow especially in situations wherein the user is leaving his workplace for only a brief period and a trip to the secure storage vault may well take longer than the break in the work schedule. In addition, the high density storage capability of the Winchester disk drive requires sensitive read-heads which are not designed to withstand significant shock. Thus, minimizing movement of the disk drive has been found to improve long-term reliability and operational lifetime of the disk storage device.

Accordingly, the present invention is directed to the provision of a secure storage device for a disk drive which enables the drive to be both stored at the worksite in a disabled condition or accessed by a qualified user so that the need for transport of the drive during a normal work day is essentially eliminated. Further, the secure storage device can be located proximate to the user workplace so that remote activation and accompanying circuitry is not needed. Also, the invention is directed to security apparatus which controls the power supply circuitry as a means of preventing unauthorized access to the data stored within.

SUMMARY OF THE INVENTION

The present invention relates to apparatus for providing a secure environment for an electronic device, for example, a data storage device. The apparatus includes an enclosure having at least one access port therein to slidably receive a drawer. The enclosure is designed to be fire-proof and tamper-proof and is provided with an external locking means for securing the drawer in a first or closed position wherein the drawer is fully inserted into the enclosure. In this position, the drawer front is flush with and forms a portion of the enclosure. The locking means is preferably located on the front panel of the drawer and may be a conventional combination lock which is set by altering the position of an handle located thereon.

The drawer receives the data storage device therein, along with any power supply equipment necessary for its use. The data storage device is provided with input and output data transmission cables which connect the device to external circuitry and upon which the flow of information takes place. In addition, a circuit is provided for electrically connecting the device to an external power supply.

The present invention is directed to apparatus for controlling the availability of power to the device when it is in place in the drawer of the apparatus. A first switch means for activating the electrical power circuit upon the movement of the drawer from its first or fully closed position is located within the enclosure. A first coupling means electrically connects the first switch means to the external power supply through a wall, typically the back wall, of the enclosure. A second coupling means electrically connects the first switch means to the data storage device located within the drawer with the opening of the drawer electrically connecting the device to the external power supply. The first switch means is responsive to the closing of the drawer and deactivates the electrical circuit automatically. Thus, the closure of the drawer containing the device results in an automatic disabling of the power supply network to the data storage device and prevents unauthorized user access thereto.

The unlocking of the drawer, and its opening, automatically enables a user having the ability to open the locking means to utilize the data storage device in the drawer. The data transmission means connecting the storage device are not coupled to the first switch means.

In addition, the apparatus includes stop means for limiting movement of the drawer to a partially-open second position. This stop means is contained within the enclosure and includes a releasable engaging means and a receiving member for receiving the engaging means when the drawer is in the second position. The release of the engaging means permits the opening of the drawer to a third position, typically a fully-open position, to permit placement and withdrawal of the electronic storage device therein.

Further features and advantages of the invention will become more readily apparent from the following detailed description of a preferred embodiment thereof when taken in conjunction with the accompanying drawings.

BRIEF DESCRIPTION OF THE DRAWINGS

FIG. 4 is a plan view of a drawer of the embodiment of FIG. 1 showing the electronic devices contained therein;

FIG. 5 is a view of the rear wall of the embodiment of FIG. 1;

FIG. 6 is an expanded view of the fastening device shown in FIG. 5.; and

FIG. 7 is a typical electrical schematic for the embodiment of FIG. 1.

DESCRIPTION OF THE PREFERRED EMBODIMENT

Figure 1:
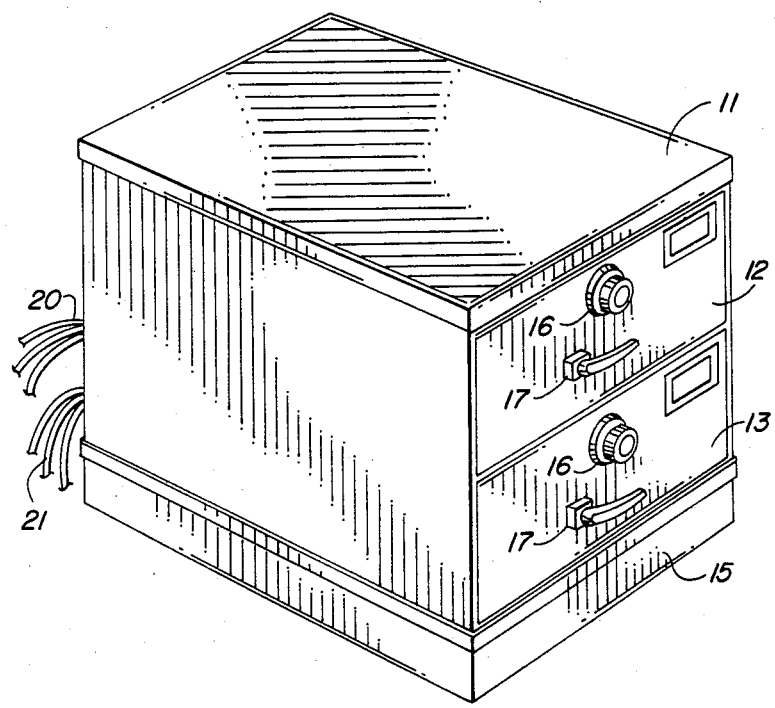
FIG. 1 is a view in perspective of a two-drawer embodiment of the invention with both drawers in a closed and locked position.

Referring now to FIG. 1, a secure storage device for receiving electronic data storage devices is shown having a parallelepiped body 11 containing first and second drawers 12, 13 therein. Each of the drawers is similar in construction and is designed to receive electronic devices therein.

Each of the drawers includes an externally accessible locking mechanism having a combination dial 16 and an arm 17 associated with it. The base 15 may be an integral part of the device or alternatively may be an independently removable elevating base. In the latter case, the enclosure 11 is provided with its own secure base. The electrical connections for the drawers 12, 13 are shown exiting the enclosure 11 as cable groups 20, 21. Each cable group includes input and output data transmission cables and a power supply cable.

Figure 2:
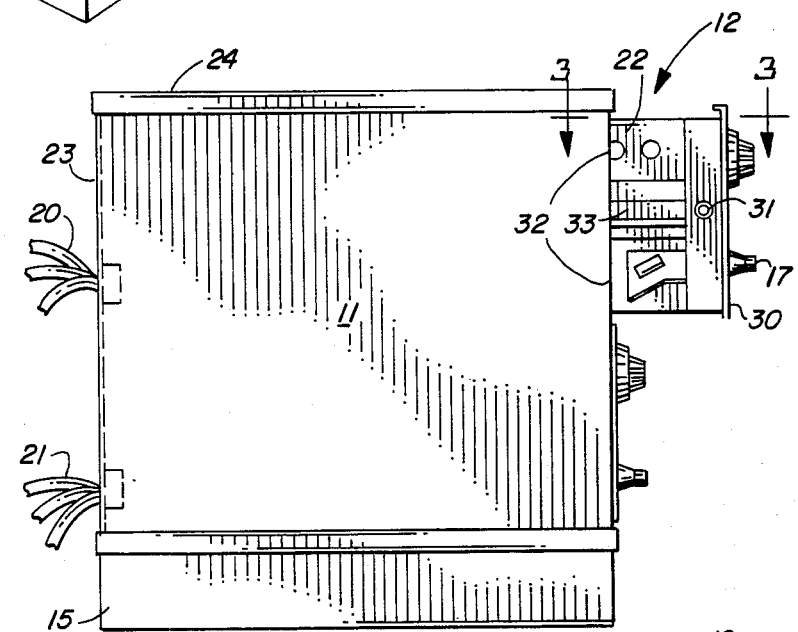
FIG. 2 is a side view of the embodiment of FIG. 1 with the top drawer being moved to its second position.

The embodiment of FIG. 1 is shown in side view in FIG. 2 with the top drawer 12 in a partially-open or first position. This position is that utilized when the data storage device contained therein is operational, as will later be discussed in detail. Drawer 12 includes a front panel 30 and a side member 22 extending into the enclosure 11. A guide 33 extends longitudinally along the side of the drawer to permit withdrawal and insertion of the drawer by the user. The locking mechanism is of conventional design and includes the handle 17 operatively coupled to securing pins 31 which extend laterally into mating recesses in the enclosure structure to secure the drawer in its closed position. A double row of apertures 32 extend along the sides of the drawer to facilitate air-flow in the drawer since the electronic devices contained generate heat during operation. Top member 24 of enclosure 11 is secured to the adjacent walls including back wall 23 from which cable groups 20 and 21 are shown exiting for external connection. The pedestal base 15 in the preferred embodiment is made an integral part of the structure.

Figure 3:
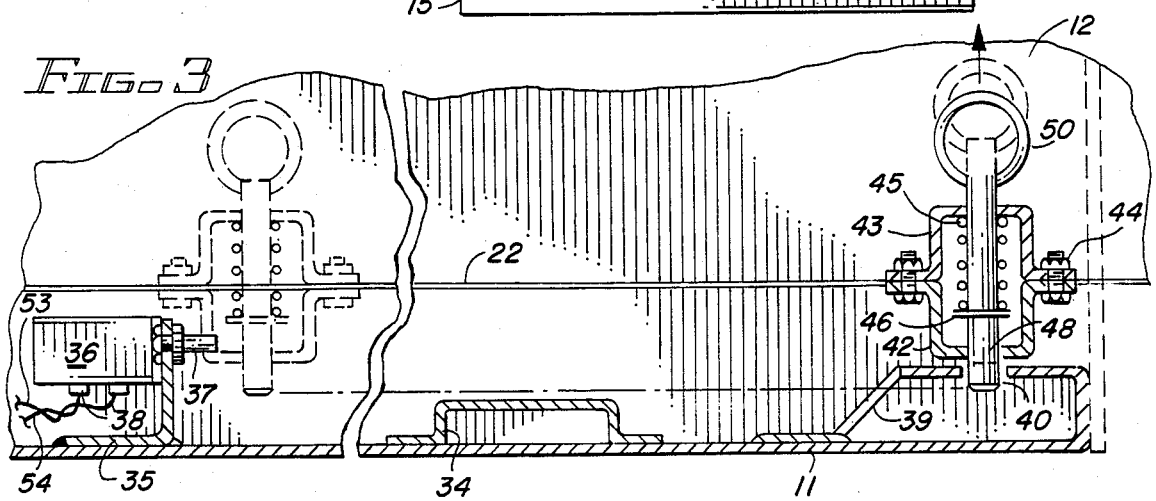
FIG. 3 is a partial top view taken along lines 3—3 of the top drawer in FIG. 2.

The drawer 12 is shown in FIG. 3 in the position corresponding to that of FIG. 2 with the releasable engaging means maintaining this position. The drawer 12 has affixed to its side wall adjacent a centrally located aperture therein, the opposing housing members 42, 43 bolted to side wall 22 by fasteners 44. Releasable locking pin 48 extends through the aperture in side wall 22 and extends outwardly of the housing members. The pin includes a circumferential flange 46 within the housing which engages biasing spring 45 as shown. A grip ring 50 is provided at the inner end of pin 48 to permit the equipment user to release the engagement means as desired.

The side wall of enclosure 11 is shown with an inwardly extending receiving aperture formed in inwardly extending flange member 39. As shown, the side wall 11 is formed integral with the flange 39 in the preferred embodiment. The end of the flange is secured to the inside surface of the side wall by welding. When the drawer is in its partially open or first position, the pin 48 is in registration with the receiving aperture 40 and extends therein to prevent accidental movement of the drawer during operation. In the event that the drawer was moved to a more fully closed position while the electronic devices contained therein were activated, the convection pattern established by the open area at the top of the drawer and the exposed apertures in the side walls would be substantially reduced, thus increasing the ambient temperature in the drawer and decreasing the operating lifetime of the devices stored therein. Also, as will later be noted, the accidental closure of the drawer during operation will result in a deactivation of the devices stored in the drawer and interruption of the operations being performed.

When the drawer 12 is fully closed and contained within the enclosure 11, the releasable engaging means is moved further into the enclosure and will engage and depress actuating pin 37 of microswitch 36. This position is shown in the dashed outlines of FIG. 3, wherein the housing 42 contacts pin 37 to depress it from the position shown in FIG. 3. It will be noted that the fully extended position of pin 48 in the releasable engaging means is limited by flange 46 so as to clear vertical support 34 affixed to the inside of the side wall of enclosure 11. The microswitch is mounted on bracket 35 affixed to the inner wall of enclosure 11 as shown. The electrical connections for the microswitch are noted to be located on the side of the switch adjacent the flange and in practice, can be taped or otherwise affixed to the side wall of enclosure 11 to prevent interference with the drawer 13 positioned therebelow.

The plan view of the open drawer in FIG. 4 shows the placement of a disk drive 51 and associated power supply 52, each containing their own fan assemblies as integral internal parts, as typical placements of equipment for use with the present invention. The disk drive and power supply each are provided with operating controls which play no part in the present invention. The front of the drawer contains the combination dial 16 and the release handle 17 on the outer surface thereof. The side wall 22 contains the housings 42 and 43 secured thereto with pin 48 extending outwardly from the side wall. Also affixed to the side wall 22 is a mounting strip 26 containing a toggle switch 27 and a circuit breaker 28. The power supply cable 58 is brought to the switch 27 which is connected in series with circuit breaker 28 and coupled by conductor 53 to the microswitch over the top of the back of drawer 12. The return conductor 54 is coupled between the microswitch and the power supply unit 52 for the disk drive. Power supply 52 is shown providing two electrical connections to the disk drive 51, one conductor 55 being coupled to the fan circuit and the other conductor being coupled to the drive circuitry within the storage device 51. The conductors 53, 54 in FIG. 4 are coupled to terminals 28 of microswitch 36 as shown in FIG. 3. The input and output data cables 57 are brought to the data storage device 51 at coupling port 60. When the power supply 52 is activated to put the storage device 51 in operating condition, these data cables provide the external connections to the computer network.

The fastening means for the data transmission cables 57 and power supply cable 58 are shown in FIGS. 5 and 6. The back wall 23 of enclosure 11 is shown containing opening 61 for the passage of the cables therethrough. On the inner surface of back wall 23 is flange 62 which receives a slotted plate 63 having mating flanges 65 on opposing sides. The insertion of plate 63 in the direction of the arrow shown in FIG. 6, provides a secure connection to external circuitry by selecting the width of slot 64 to be less than the diameter of the cable coupling device 80 used to provide external connection. While a circular coupling device 80 is shown in FIG. 5, it is recognized that the type of data cable and number of conductors in each cable determine the particular configuration used. However, the width of the slots in plate 63 is selected to prevent withdrawal of the cable from the enclosure. Thus, access cannot be obtained from without to the data contained in the disk drive 51.

The block schematic diagram of FIG. 7 shows the serial connection of the different components in the power supply circuitry. The external power supply is coupled to the toggle or power switch 27 which in turn is serially connected to the circuit breaker 28 and next to the microswitch 36. The return lead 54 from the microswitch is coupled to the power supply having its own fan which in turn drives the disk drive and associated fan.

In operation, the present invention is shown in FIG. 1 in a fully secured or locked position. When the operator comes to his work station and wishes to utilize the disk drive secured in either of the drawers, the combination lock is released and the drawer opened to its first position as shown in FIGS. 2 and 3. The movement of the drawer to its partially-open position results in the power supply 52 for the disk drive 51 being connected to the external power source. The microswitch is placed in its activated position by the movement of pin 48 forward to the receiving aperture 40. This locks the drawer in position for operation and establishes the conductive path through the microswitch. The operator then switches on the power switch 27 and is then free to utilize the controls on the disk drive and associated power supply modules. During operation, the combination of open drawer and apertured side walls in the drawer provide convection paths for the heat generated by the operating electronic devices contained therein. While the device is in its non-operational or locked drawer position, the data transmission path is secured by the fastening means on the back wall of the enclosure so that the data transmission cables cannot be utilized by other equipment. This is due to the fact that the inner connections are maintained within the secure enclosure at all times. In the event that either module 51 or 52 are to be removed from the drawer for service, the operator need only grasp ring 50 to free the pin 48 and permit the drawer to be fully opened. Thus, a secure environment for data storage devices can be provided at individual work places where the operator can readily secure his data base while absenting the work place. This is accomplished without requiring the transport of the disk storage device to a central vault.

While the foregoing description has referred to a specific embodiment of the invention, it is to be recognized that many variations and modifications may be made therein without departing from the scope of the invention as claimed.

What is claimed is:

1. Apparatus for providing a secure environment for an electronic device, said apparatus comprising:
   (a) an enclosure having a backwall, opposing side walls and a front portion containing at least one access port therein;
   (b) a drawer having opposing sidewalls and movably mounted in said access port for movement between a closed position and a full open position, said drawer receiving an electronic device therein;
   (c) locking means for securing said drawer in the closed position;
   (d) first switch means mounted on a wall of said enclosure for deactivating an electrical circuit coupled between the electronic device in the drawer and an external power supply upon the movement of said drawer to said closed position;
   (e) first coupling means for electrically connecting said first switch means to said external power supply through said enclosure;
   (f) second coupling means for electrically connecting said first switch means to the electronic device located within said drawer whereby the opening of said drawer electrically connects said device to the external power supply;
   (g) releasable engaging means contained in said drawer and extending through an aperture in a sidewall of said drawer, said engaging means contacting said first switch means to deactivate the circuit when said drawer is in the closed position;
   (h) a receiving member mounted on a side wall of said enclosure for receiving said engaging means and maintaining said drawer in a partial open position, the release of said engaging means from within said drawer permitting movement of said drawer to open or closed positions; and
   (i) data transmission means for connection to said device and extending outwardly through said enclosure for connection with external circuitry.

2. Apparatus in accordance with claim 1 further comprising biasing means for urging said engaging means through an aperture in a sidewall of said drawer.

3. Apparatus in accordance with claim 1 further comprising fastening means attached to the inside of one of said walls of said enclosure for engaging said first coupling means and preventing withdrawal from within the enclosure.

4. Apparatus in accordance with claim 3 wherein said data transmission means are engaged by the fastening means when extending outwardly of the enclosure.

5. Apparatus in accordance with claim 4 further comprising a second switch means mounted within said drawer and connected electrically in series with said first switch means for further controlling the supply of power to the electronic device.

6. Apparatus in accordance with claim 5 wherein said drawer is provided with apertures to facilitate air-flow within drawer.

7. In a security enclosure for use in controlling access to electronic devices contained therein and having an external electrical connection thereto, said enclosure having at least one drawer therein along with external locking means for securing the drawer in its fully-closed position, the improvement comprising;
  (a) a first switch mounted within said enclosure and spaced adjacent said drawer, said switch being coupled to the external electrical connection;
  (b) stop means movably mounted within said drawer and extending outwardly therethrough for deactivating said first switch when the drawer is in its fully-closed position;
  (c) receiving means contained within said security enclosure and laterally spaced from said first switch for engaging the stop means and limiting movement of said drawer to a partially-open position; and
  (d) means affixed to said stop means within said drawer for enabling release from engagement with said receiving means.

8. The invention of claim 7 wherein the first switch is positioned within said enclosure adjacent the drawer and is contacted by said stop means when the drawer is in the fully-closed position.

9. The invention of claim 8 further comprising fastening means affixed to the inside of said enclosure for transporting the electrical connection to an external power supply.

10. The invention of claim 9 further comprising a second switch mounted in said drawer and connected electrically to said first switch for deactivating at least one of said electronic devices contained within said drawer.

* * * * *